United States Patent [19]

Kostizak

[11] Patent Number: 5,448,050
[45] Date of Patent: Sep. 5, 1995

[54] INTEGRATED BAR CODE READING AND LOCATION MOUSE

[75] Inventor: David Kostizak, Rochester, N.Y.

[73] Assignee: PSC Inc., Webster, N.Y.

[21] Appl. No.: 975,760

[22] Filed: Nov. 13, 1992

[51] Int. Cl.⁶ .................................... G06K 7/10
[52] U.S. Cl. .................... 235/472; 235/440; 235/454; 235/462
[58] Field of Search ............... 235/440, 467, 472, 454, 235/462

[56] References Cited

U.S. PATENT DOCUMENTS

| | | | |
|---|---|---|---|
| 4,488,679 | 12/1984 | Bockholt | 235/472 |
| 4,521,773 | 6/1985 | Lyon | 235/472 |
| 4,703,186 | 10/1987 | Nakayama | 235/472 |
| 4,780,707 | 10/1988 | Selker | 235/472 |
| 4,782,221 | 11/1988 | Brass | 235/494 |
| 4,793,812 | 12/1988 | Sussman | 235/472 |
| 4,804,949 | 2/1984 | Faulkerjon | 235/472 |
| 4,860,377 | 8/1989 | Ishigaki | 235/472 |
| 4,906,843 | 3/1990 | Jones | 235/472 |
| 4,959,871 | 9/1990 | Mori | 235/472 |
| 5,023,922 | 6/1991 | Abramovitz | 235/472 |
| 5,142,131 | 8/1992 | Collins | 235/435 |
| 5,151,581 | 9/1992 | Krichever | 235/467 |
| 5,206,491 | 4/1993 | Katoh | 235/467 |
| 5,227,909 | 7/1993 | Watson | 235/472 |
| 5,229,588 | 7/1993 | Detwiller | 235/467 |
| 5,301,243 | 4/1994 | Olschafskie | 235/472 |
| 5,369,262 | 11/1994 | Dvorkis | 235/472 |

Primary Examiner—Harold Pitts
Attorney, Agent, or Firm—Joseph F. Murphy

[57] ABSTRACT

A bar code scanning engine (34) is disposed in a housing (12) with a device (24, 26) which tracks the movement of the housing over a surface (22) displaying symbols such as bar codes and provides an integrated bar code reading and locating assembly, commonly known as a mouse (10). When the mouse is in proximity to the bar code on the surface over which it tracks, switches (18, 19) on the mouse are actuated and circuitry in the mouse associated with the device and with the scanning engine initiates scanning, and provide outputs representing the location of the mouse on the surface and the bar code. The circuitry may be adapted to enable bar code scanning only when the mouse is located at selected positions on the surface where bar codes are expected to be found. The entire mouse assembly may be lifted from the surface and operated in a manner similar to a tethered hand-held bar code scanner using switches (18), (19) and scanner engine (34).

11 Claims, 1 Drawing Sheet

INTEGRATED BAR CODE READING AND LOCATION MOUSE

DESCRIPTION

The present invention relates to symbol reading systems for reading symbols such as bar codes on a surface, and particularly to a mouse trackable over the surface which provides outputs representing the position of the mouse on the surface and also the symbol.

The invention is especially suitable for use in reading bar codes on forms where one or more of bar codes are located and data input is being performed via a keyboard and/or mouse into a computer system with software using the point and shoot capabilities customarily associated with a mouse. The form may also be placed on a pad and a mouse having an integrated bar code reader and location encoder is tracked over the surface. Outputs corresponding to the location of each of the bar codes and which represent the bar code at that location are then provided successively as the mouse is manipulated over the surface. These outputs classify the bar codes by location.

It has become common to place a plurality of bar codes on an item (e.g., the surface of the package containing the item) to identify the item in various ways, such as by stock number, inventory control number, manufacturing date, etc. Using a hand held bar code scanning reader, it is difficult to locate the scanning beam on particular ones of the bar codes on the surface which are to be scanned. Also the operator must keep track of which code is being scanned or additional information (bars) must be provided in order to identify the category of each of the codes. There may be insufficient space on the surface for the bar codes which have sufficient bars for the latter purpose. It is a feature of this invention to provide symbol (e.g., bar code) reading apparatus (which is adapted for use with bar code scanners which deflect an optical beam across the codes) which automatically provides outputs representing the codes and outputs representing the locations where the codes are being read/scanned, and particularly to an integrated device with which operating personnel are familiar or can easily be trained to use, namely a device similar to a computer mouse.

Briefly described, a mouse-like device in accordance with the invention is provided as an integrated optical symbol reading and location apparatus having a housing which is movable over a surface on which the symbols may be presented for reading. The apparatus includes first means in the housing which is responsive to the location or movement of the housing on the surface for providing a first output representing the location. Second means for reading the symbols is responsive to light received from the symbols, as upon illumination by a scanning beam of a scan engine in the housing which is deflected out of a window in the housing towards the surface. Means are provided for enabling the first means (e.g., an encoder carried in the housing which tracks over the surface on which the bar codes are presented) and also the second means, when the housing is located in proximity to the symbols. The enabling means may include switches for circuitry in the housing to provide the location outputs and outputs representing the symbol being read. Also the entire assembly may be lifted from the surface and operated in the same manner as a hand held bar code scanner using the first means to enable reading of the symbol.

The foregoing and other features of the invention will become more apparent from a reading of the following description in connection with the accompanying drawings in which.

Figure 1:
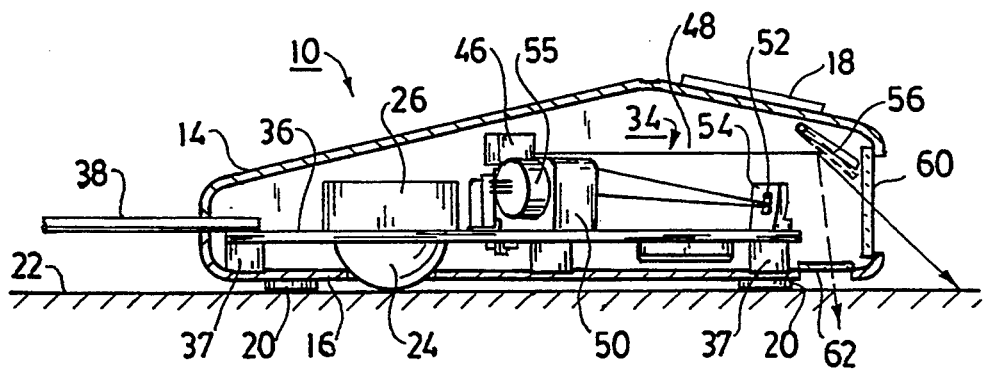
FIG. 1 is a sectional view, in elevation, of an integrated bar code reading and location mouse device, the section being taken along the line 1—1 in FIG. 2.
Figure 2:
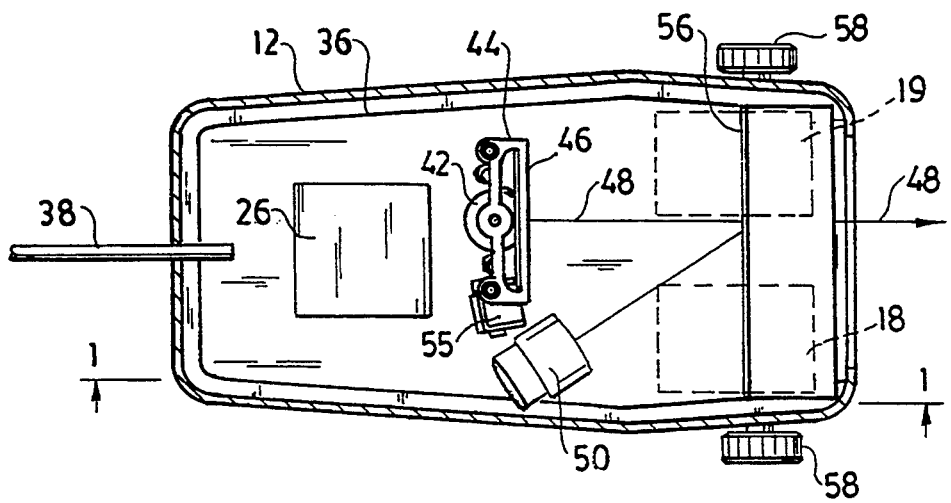
FIG. 2 is a plan view of the device shown in FIG. 1 with the top of the housing removed to illustrate the reading and location components therein.

Referring to FIGS. 1 and 2, there is shown an integrated bar code reader and location detection apparatus which has a shape and size, of, and is operative in a manner similar to, a computer mouse. Accordingly, it is referred to as a bar code reading mouse 10. A housing 12 has top and bottom parts 14 and 16 which may snap together along a horizontal parting joint (not shown). The upper part of the housing 14 provides a top for the mouse 10 and the bottom part 16 provides the bottom of the mouse. The top has a pair of keys 18 and 19 the location of which is shown by the dash line boxes in FIG. 2. These keys operate electrical switches ($SW_1$ and $SW_2$) (see FIG. 3). The bottom of the housing 12 has pads 20 which space the housing from a surface 22 on which bar codes appear. The spacing is such that a ball 24 of an incremental encoder 26 contacts and engages the surface 22 and can roll universally as the mouse is moved in any direction along the surface 22.

Figure 3:
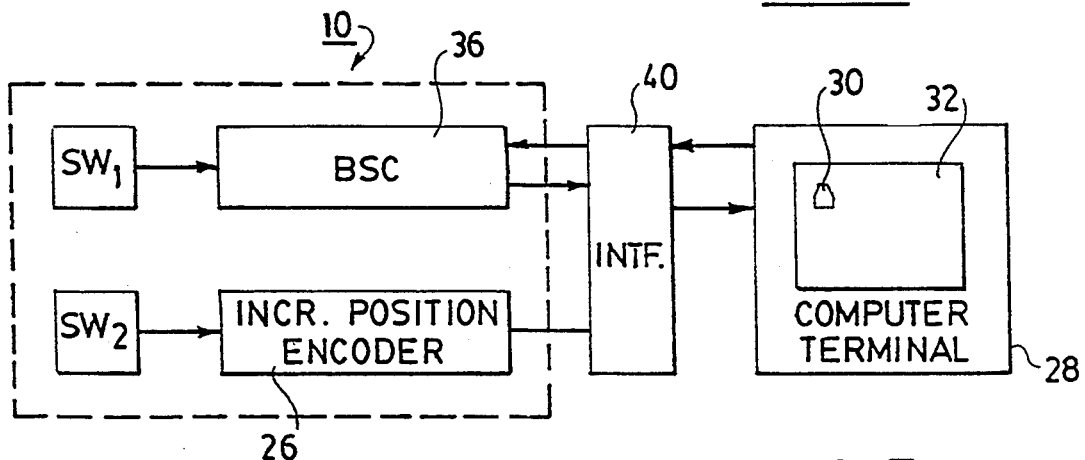
FIG. 3 is a schematic, block diagram of a typical installation of the device shown in FIGS. 1 and 2.

The incremental encoder may be of the type used in computer mouses. It provides an output indicating the relative displacement of the mouse along the surface 22. This displacement is converted by software in a computer terminal 28 (FIG. 3) so that the location of the mouse, indicated at 30 on the display screen 32 of the terminal 28 shown in FIG. 3 is indicated. Instead of a mechanical encoder type mouse location detection means, an optical encoder may be used. Then the surface 22 may be inscribed with orthogonal lines to which the optical encoder responds.

Reading of the bar codes is provided by a scan engine 34 having electrical and optical components mounted on a printed circuit board 36. This board 36 also mounts the encoder 26 and supports the ball 24. Electrical circuit paths or traces and terminals from the electrical components, which are connected to the traces on the board 36, are not shown to simplify the illustration. These circuits are connected to leads in a cable 38, which is a flexible cable extending from the mouse 10 to the computer terminal 28 (FIG. 3). The computer terminal or the board 36 may have components which provide an interface 40 which processes the output signals which are generated in the mouse 10 and may also provide input signals for controlling the operation of the mouse 10, as will be explained hereinafter. The interface may include signal conditioning means, decoders, and/or multiplexers of the type conventionally used to implement the interface functions.

The scan engine 34 is of a design similar to the design of the scan engine described in U.S. patent application Ser. No. 07-652,158 filed Feb. 7, 1991 by Jay M. Eastman, et al., now matured as U.S. Pat. No. 5,200,597 issued Apr. 6, 1993, and assigned to the same assignee as the present Application. In the scan engine, a motor 42 pivots a mount 44 having a reflective surface 46 which projects a scanning beam 48. This beam is generated by a laser diode in a barrel or mount 50 which reflects from a facet 52 of a light collecting mirror 54. The collected light is reflected by the mirror 54 to a photo detector 55 and converted into analog bar code signals. These signals may be processed and decoded by circuits, including integrated circuit chips containing microprocessor devices and memory which are located on the board 36 but not shown to simplify the illustration. The board is mounted by mounts 37 on the inside surface of the bottom of the housing 12. When portable operation is desired, batteries can be carried on board the mouse. Radio, optical (e.g. infra-red) or accoustic links instead of wires may be used.

The scan beam 48 is incident on a mirror 56 of a mirror assembly including knobs 58 which extend from the sides of the housing 12. The mirror 56 folds the scan beam 48 so that it is deflected downwardly towards the surface 22 through either a window or port 60 in the front end of the housing or a window or port 62 in the bottom of the housing. These ports may be covered by transparent plates or may contain lenses for focussing the beam at the surface 22 or collimating the beam.

In a first mode of operation of the mouse, it is tracked along the surface 22 until in the proximity of a bar code. Then $SW_2$ is actuated by operating key 19 so as to provide an output through the interface to the terminal indicative of the location of the mouse in scanning position with respect to a selected code on the surface. Then $SW_1$ is actuated by operating key 18 and the bar code scanner is enabled to provide a bar code signal output through the interface to the terminal which processes and/or displays the output or a code corresponding thereto or may store that code in a memory associated with the computer in the terminal.

In another mode of operation of the device the computer is programmed (information being stored in its memory/database) as to the position of bar codes on the surface which are desired to be read. Then outputs are provided by the computer in response to location information from the encoder 26 relayed to the computer via the interface 40. The computer generates an output which, alternatively to $SW_1$, enables the bar code scanner 36 to scan the code. Then only selected codes on the surface will be scanned. Also the mouse may be lifted from the surface 22, pointed at a bar code (say on a package) and $SW_1$, operated to scan and read the bar code. Thus, the mouse is operative even when it is not placed on the surface 22 or another surface (e.g. the surface of the package).

From the foregoing description, it will be apparent that there has been provided improved symbol (bar code) reading apparatus which provides the facilities of a computer-type mouse for location and display of location and also a bar code reader to be used in conjunction with computer systems and software using input data from a mouse, a bar code scanner, a keyboard or the like. Variations and modifications in the herein illustrated integrated symbol reading and location apparatus, within the scope of the invention, will undoubtedly suggest themselves to those skilled in the art. Accordingly the foregoing description should be taken as illustrative and not in a limiting sense.

I claim:

1. Integrated optical bar code reading and location apparatus which comprises a housing moveable over a surface on which an optically readable bar code is located, first means in said housing responsive to the location or movement of said housing on said surface for providing a first output representative of said location, second means also in said housing responsive to temporal variations in amplitude of light returned from said bar code for providing a second output representing the said bar code, and means for enabling said first and second means to provide their respective outputs when said housing is located on said surface in proximity to said bar code.

2. The apparatus according to claim 1 wherein said second means is an optical scanning engine comprising:
   (a) means to produce an optical beam;
   (b) means to impinge said beam onto said bar code;
   (c) means to detect light returned from said bar code; and
   (d) circuitry for translating said temporal variations in returned light into analog electrical signals representative of said bar code.

3. The apparatus according to claim 2 wherein said first means comprises an incremental encoder.

4. The apparatus according to claim 3 wherein said encoder comprises a ball protruding from said housing along one side thereof and engageable with said surface, said ball being rotatably mounted for rotation when engaged with said surface and moved along said surface.

5. The apparatus according to claim 3 further comprising a circuit board in said housing, said scan engine having optical and electrical components mounted on said board, and said encoder also being mounted on said board.

6. The apparatus according to claim 1 wherein said housing has a top and a bottom disposed over said surface, said housing also having front and rear ends, said second means being a scan engine having means for generating a scanning beam directed towards said front end, a window in said front end and a beam folding mirror in said housing tilted downwardly to deflect said beam through said window toward said surface.

7. The apparatus according to claim 2 wherein said housing has a top and a bottom disposed over said surface, said housing also having front and rear ends, said scan engine having means for generating an optical beam directed towards said front end, a window in said bottom, and a beam folding mirror in said housing and tilted downwardly to reflect said beam through said window toward said surface.

8. The apparatus according to claim 2 wherein said housing has a top and a bottom disposed over said surface, said housing also having front and rear ends, said scan engine having means for generating said optical beam directed toward said front end, windows in said front end and said bottom, and a beam folding mirror pivotably mounted and selectably tiltable between first and second positions where it reflects said beam downwardly through different ones of said front and bottom windows, respectively, toward said surface.

9. The apparatus according to claim 1 wherein said enabling means comprises first and second electrical switch means selectably operative for enabling said first and second means.

10. The apparatus according to claim 1 wherein said enabling means comprises means responsive to said first output for enabling said second means when said housing is located at at least one selected location on said surface and none other than said selected location.

11. The apparatus according to claim 1 further comprising means for enabling bar code reading when said housing is lifted off said surface.

* * * * *